United States Patent
Okamoto et al.

(10) Patent No.: US 10,626,953 B2
(45) Date of Patent: Apr. 21, 2020

(54) VARIABLE SPEED INCREASER AND CONTROL METHOD THEREOF

(71) Applicant: MITSUBISHI HEAVY INDUSTRIES COMPRESSOR CORPORATION, Tokyo (JP)

(72) Inventors: Yoshiyuki Okamoto, Hiroshima (JP); Hiroyuki Miyata, Hiroshima (JP); Hideki Tonaka, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 8 days.

(21) Appl. No.: 16/197,597

(22) Filed: Nov. 21, 2018

(65) Prior Publication Data

US 2019/0264779 A1    Aug. 29, 2019

(30) Foreign Application Priority Data

Feb. 27, 2018   (JP) .................................. 2018-032922

(51) Int. Cl.
  *F16H 57/08*  (2006.01)
  *F16H 1/28*   (2006.01)
  *F16H 3/72*   (2006.01)

(52) U.S. Cl.
  CPC ........... *F16H 1/2827* (2013.01); *F16H 3/724* (2013.01); *F16H 57/082* (2013.01)

(58) Field of Classification Search
  None
  See application file for complete search history.

(56) References Cited

U.S. PATENT DOCUMENTS

| 5,771,478 A * | 6/1998 | Tsukamoto | B60K 6/365 180/65.25 |
| 6,387,007 B1 * | 5/2002 | Fini, Jr. | B60K 6/26 180/65.22 |
| 6,461,266 B1 * | 10/2002 | Weisz | B60L 50/16 475/5 |

(Continued)

FOREIGN PATENT DOCUMENTS

| JP | 4472350 B2 | 6/2010 |
| JP | 4549718 B2 | 9/2010 |

(Continued)

*Primary Examiner* — Dirk Wright
(74) *Attorney, Agent, or Firm* — Osha Liang LLP

(57) ABSTRACT

There is provided a variable speed increaser including a planetary gear transmission device which changes the speed of a rotational driving force of the electric driving device and transmits the changed rotation driving force to a driving target, and a rotation rate controller. The electric driving device includes a constant-speed motor having a constant-speed rotor, and a variable-speed motor having a variable-speed rotor and driven in a regenerative mode and in a power mode. A rotation rate of the output shaft varies within an operation range between a maximum rotation rate and a minimum rotation rate. The constant-speed motor has a rated torque which allows the output shaft to have the maximum rotation rate by itself. The rotation rate controller changes the rotation rate of the output shaft rotating within the operation range by driving the variable-speed motor only in the regenerative mode.

6 Claims, 7 Drawing Sheets

(56) References Cited

U.S. PATENT DOCUMENTS

| | | | | |
|---|---|---|---|---|
| 6,877,575 B2 * | 4/2005 | McCarthy | ............. | B60K 6/387 |
| | | | | 180/65.235 |
| 7,211,018 B2 * | 5/2007 | Kimura | .................. | F16H 3/724 |
| | | | | 475/153 |
| 10,465,774 B2 * | 11/2019 | Okamoto | ................ | F16H 61/02 |
| 2004/0259679 A1 | 12/2004 | Becquerelle et al. | | |
| 2005/0113201 A1 | 5/2005 | Kimura et al. | | |
| 2017/0170755 A1 | 6/2017 | Okamoto et al. | | |
| 2018/0245671 A1 | 8/2018 | Okamoto | | |

FOREIGN PATENT DOCUMENTS

| | | |
|---|---|---|
| JP | 2010-255737 A | 11/2010 |
| WO | 2016/009564 A1 | 1/2016 |
| WO | 2017/037934 A1 | 3/2017 |

* cited by examiner

VARIABLE SPEED INCREASER AND CONTROL METHOD THEREOF

CROSS-REFERENCE TO RELATED APPLICATION

Priority is claimed on Japanese Patent Application No. 2018-032922, filed Feb. 27, 2018, the content of which is incorporated herein by reference.

BACKGROUND OF THE INVENTION

Field of the Invention

The present invention relates to a variable speed increaser and a control method thereof.

Description of Related Art

As an apparatus for driving a rotary machine such as a compressor, there is an apparatus including an electric driving device for generating a rotational driving force and a transmission device for changing the speed of a rotational driving force generated by the electric driving device and then transmitting the speed-changed rotational driving force to the rotary machine.

Patent Document 1 discloses a variable speed increaser in which a constant-speed motor and a variable-speed motor for speed change are used as the electric driving device and a planetary gear transmission device is used as the transmission device to accurately control a gear ratio. In this apparatus, it is possible to change a rotation rate of an output shaft of the transmission device connected to the rotary machine by changing a rotation rate of the variable-speed motor.

PATENT DOCUMENTS

[Patent Document 1] Japanese Patent Publication No. 4472350

However, in the variable speed increaser, a rotation direction of the output shaft is always a constant direction, and due to mechanical properties of the planetary gear transmission device, a reverse torque constantly acts on planetary gears. Therefore, when the variable-speed motor rotates forward, a power mode is set, and when the variable-speed motor rotates in reverse, a regenerative mode is set. When the power mode and the regenerative mode are switched, a gear in the planetary gear transmission device rotating by the variable-speed motor also rotates in reverse. When a rotation direction of the gear is switched, transmission of a torque from the electric driving device to the output shaft becomes discontinuous, and thus instability of control may be caused or efficiency may be reduced due to loss.

The present invention provides a variable speed increaser capable of operating efficiently, and a control method thereof.

SUMMARY OF THE INVENTION

According to a first aspect of the present invention, a variable speed increaser includes an electric driving device which generates a rotational driving force, and a planetary gear transmission device which changes the speed of the rotational driving force transmitted from the electric driving device to a constant-speed input shaft and a variable-speed input shaft and transmits the changed rotation driving force to a driving target through an output shaft. The electric driving device includes a constant-speed motor having a constant-speed rotor which rotates the constant-speed input shaft of the planetary gear transmission device, and a variable-speed motor having a variable-speed rotor which rotates the variable-speed input shaft of the planetary gear transmission device and driven in a regenerative mode in which the variable-speed motor serves as a generator and in a power mode in which the variable-speed motor serves as an electric motor. The variable speed increaser further includes a rotation rate controller which adjusts a rotation rate of the variable-speed motor. A rotation rate of the output shaft varies within an operation range between a maximum rotation rate and a minimum rotation rate. The constant-speed motor has a rated torque which allows the rotation rate of the output shaft to be the maximum rotation rate by itself. The rotation rate controller changes the rotation rate of the output shaft rotating within the operation range by driving the variable-speed motor only in the regenerative mode.

According to the above configuration, the variable-speed motor is not brought into a non-controlled state by the operation mode being switched from the regenerative mode to the power mode while the output shaft is being rotated. As a result, in the transmission device, a rotation direction of various gears is not switched in the middle. Therefore, it is possible to minimize instability of control and loss between the gears when the rotation direction of the gears in the transmission device is switched.

According to a second aspect of the present invention, in the first aspect, the rotation rate controller may set the rotation rate of the output shaft within the operation range to an intermediate rotation rate between the maximum rotation rate and the minimum rotation rate when the rotation rate of the variable-speed motor in the regenerative mode in a constant-torque region in which constant torque control is possible in the variable-speed motor becomes a maximum value.

According to a third aspect of the present invention, in the first or second aspect, the rotation rate controller may set the output shaft to have the minimum rotation rate by increasing the rotation rate of the variable-speed motor in the regenerative mode to a range beyond a constant-torque region in which the constant torque control is possible in the variable-speed motor.

According to a fourth aspect of the present invention, in any one of the first to third aspects, the rotation rate controller may adjust the rotation rate of the variable-speed motor in the regenerative mode so that a torque of the variable-speed motor does not fall below a torque of the output shaft.

According to above configurations, it is possible to prevent the operation of the variable-speed motor from becoming unstable due to the torque of the output shaft becoming larger than the torque of the variable-speed motor during the adjustment of the rotation rate in the regenerative mode of the variable-speed motor.

According to a fifth aspect of the present invention, in any one of the first to fourth aspects, the variable-speed motor may have a rated torque larger than a maximum torque of the output shaft.

According to the above configuration, it is possible to reliably prevent the torque of the variable-speed motor from falling below the torque of the output shaft during the adjustment of the rotation rate of the variable-speed motor in the regenerative mode, and thus it is possible to reliably minimize unstable operation of the variable-speed motor.

According to a seventh aspect of the present invention, there is provided a method of controlling a variable speed increaser which includes an electric driving device which generates a rotational driving force, and a planetary gear transmission device which changes the speed of the rotational driving force transmitted from the electric driving device to a constant-speed input shaft and a variable-speed input shaft and transmits the changed rotation driving force to a driving target through an output shaft, and in which the electric driving device includes a constant-speed motor having a constant-speed rotor which rotates the constant-speed input shaft of the planetary gear transmission device, and a variable-speed motor having a variable-speed rotor which rotates the variable-speed input shaft of the planetary gear transmission device and being driven in a regenerative mode in which the variable-speed motor serves as a generator and in a power mode in which the variable-speed motor serves as an electric motor, wherein a rotation rate of the output shaft varies within an operation range between a maximum rotation rate and a minimum rotation rate, and wherein the constant-speed motor has a rated torque which allows the rotation rate of the output shaft within the operation range to be a maximum value by itself, the method including changing the rotation rate of the output shaft rotating within the operation range by driving the variable-speed motor only in the regenerative mode.

According to the variable speed increaser and the control method thereof described above, efficient operation is possible.

DETAILED DESCRIPTION OF THE INVENTION

First Embodiment

Hereinafter, a variable speed increaser 1 according to a first embodiment of the present invention will be described in detail with reference to the drawings.

Figure 1:
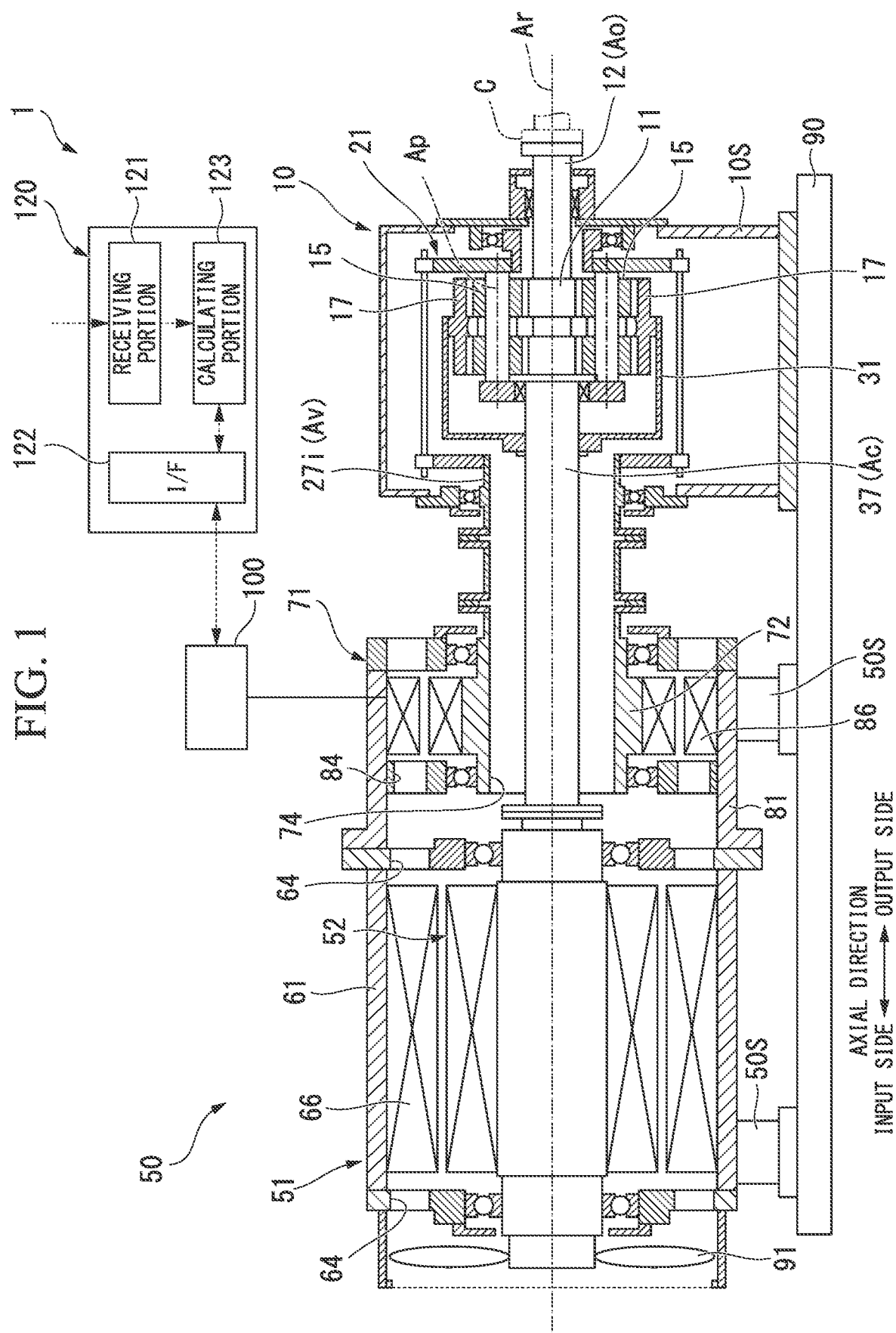
FIG. 1 is a cross-sectional view of a variable speed increaser according to a first embodiment of the present invention.

As shown in FIG. 1, the variable speed increaser 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable speed increaser 1 can be applied to, for example, a fluid mechanical system such as a compressor system. The driving target of the variable speed increaser 1 of the embodiment is a compressor C.

The transmission device 10 is a planetary gear transmission device. The electric driving device 50 includes a constant-speed motor 51 having a constant-speed rotor 52 which rotates at a constant speed, and a variable-speed motor 71 having a variable-speed rotor 72 which rotates at an arbitrary rotation rate. Each of the constant-speed rotor 52 and the variable-speed rotor 72 is connected to the transmission device 10.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 2:
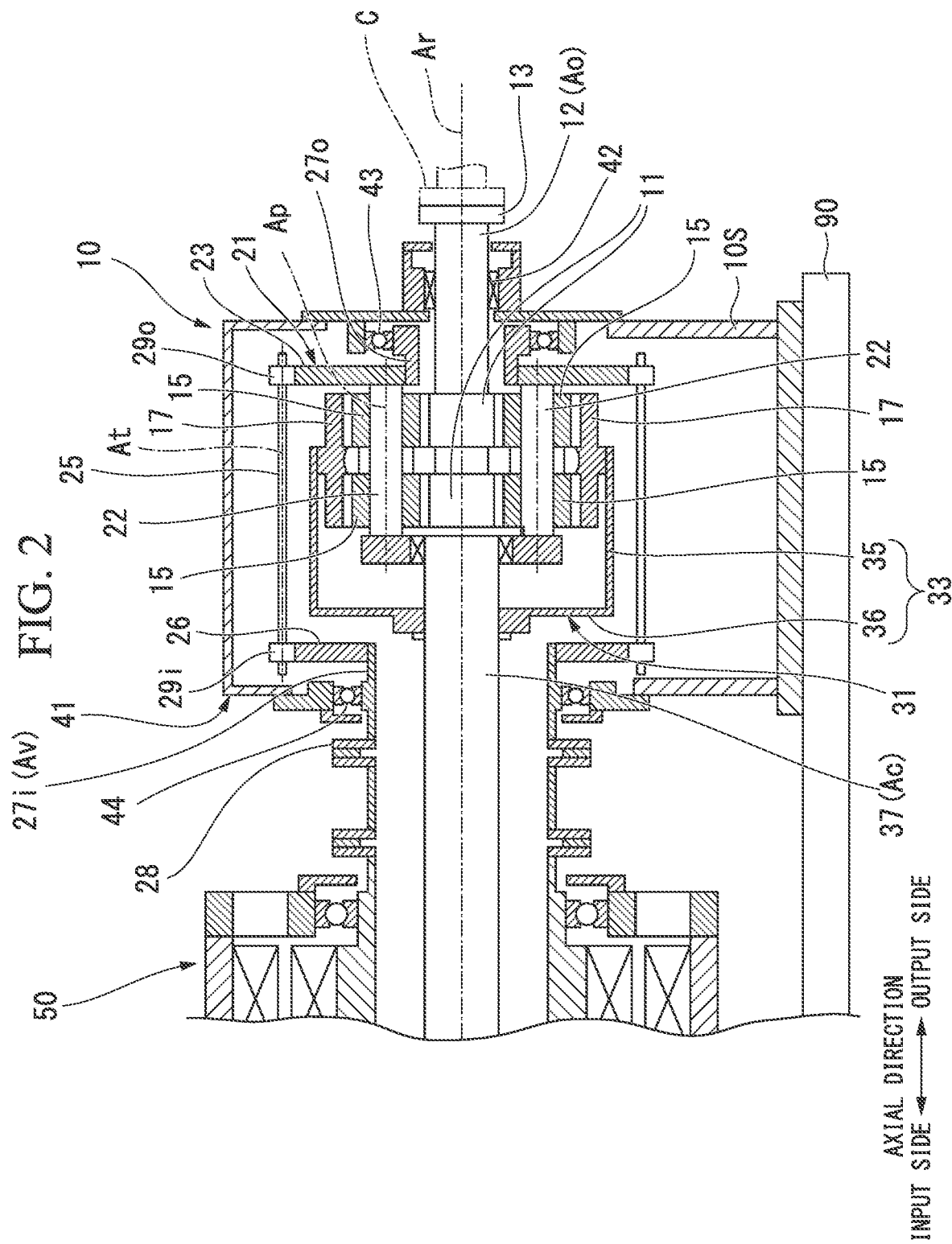
FIG. 2 is a cross-sectional view of a transmission device according to the first embodiment of the present invention.

As shown in FIG. 2, the transmission device 10 includes a sun gear 11 which rotates about an axis Ar extending in a horizontal direction, a sun gear shaft 12 fixed to the sun gear 11, a plurality of planetary gears 15 which mesh with the sun gear 11, revolve around the axis Ar and rotate about their own center lines Ap, an internal gear (gear) 17 in which a plurality of teeth are arranged in an annular shape around the axis Ar and which meshes with the plurality of planetary gears 15, a planetary gear carrier 21 which supports the plurality of planetary gears 15 to allow the plurality of planetary gears 15 to revolve around the axis Ar and to rotate about their own center lines Ap, an internal gear carrier (gear carrier) 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. Also, a radial direction around the axis Ar is simply referred to as a radial direction. In the variable speed increaser 1 of the embodiment, the electric driving device 50 is disposed on the input side in the axial direction, and the transmission device 10 is disposed on the output side of the electric driving device 50. The compressor C is disposed on the output side of the variable speed increaser 1.

The sun gear shaft 12 has a circular column shape centered on the axis Ar and extends from the sun gear 11 toward the output side in the axial direction. A connection flange 13 is formed at the output-side end of the sun gear shaft 12. For example, a rotor of the compressor C which serves as a driving target is connected to the connection flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes a planetary gear shaft 22 provided for each of the plurality of planetary gears 15, a planetary gear carrier main body 23 which fixes the relative positions of the plurality of planetary gear shafts 22, and an output-side planetary gear carrier shaft 27o which extends in the axial direction centered on the axis Ar. The output-side planetary gear carrier shaft 27o is fixed to an inner side of the planetary gear carrier main body 23 in the radial direction.

The planetary gear shaft 22 passes through the center lines Ap of the planetary gears 15 in the axial direction and supports the planetary gears 15 to allow the planetary gears 15 to rotate about a center line Ap thereof. The planetary gear carrier main body 23 extends outward in the radial direction from the plurality of planetary gear shafts 22.

The output-side planetary gear carrier shaft 27o extends from the planetary gear carrier main body 23 toward the output side. The output-side planetary gear carrier shaft 27o is formed in a cylindrical shape centered on the axis Ar.

The output-side planetary gear carrier shaft 27o is supported to be rotatable about the axis Ar by a first planetary gear carrier bearing 43. The first planetary gear carrier bearing 43 is installed at the transmission casing 41. The sun gear shaft 12 is inserted through the inner circumferential side of the output-side planetary gear carrier shaft 27o.

The transmission device 10 further includes an input-side planetary gear carrier shaft 27i which is connected to the variable-speed rotor 72 of the variable-speed motor 71, and a transmitting shaft 25 which transmits rotation of the input-side planetary gear carrier shaft 27i to the planetary gear carrier 21.

The input-side planetary gear carrier shaft 27i is formed in a cylindrical shape centered on the axis Ar. The input-side planetary gear carrier shaft 27i is disposed on the input side of the transmission device 10 and is supported by a second planetary gear carrier bearing 44 to be rotatable about the axis Ar. The second planetary gear carrier bearing 44 is installed at the transmission casing 41. An internal gear carrier shaft (gear carrier shaft) 37 for driving the internal gear carrier 31 of the transmission device 10 is inserted through the inner circumferential side of the input-side planetary gear carrier shaft 27i.

An annular planetary gear flange 28 which expands outward in the radial direction is formed at the input-side end of the input-side planetary gear carrier shaft 27i. An input-side arm portion 26 which extends outward in the radial direction is formed on the output-side end of the input-side planetary gear carrier shaft 27i.

The transmitting shaft 25 is supported to be rotatable about the axis At. The transmitting shaft 25 is installed at the transmission casing 41 via a bearing (not shown). An input-side transmitting gear 29i and an output-side transmitting gear 29o are fixed to both ends of the transmitting shaft 25.

The input-side transmitting gear 29i meshes with a gear formed on the outer circumference of the input-side arm portion 26. The output-side transmitting gear 29o meshes with a gear formed on the outer circumference of the planetary gear carrier main body 23. Accordingly, the rotation of the input-side planetary gear carrier shaft 27i is transmitted as rotation in a direction opposite to that of the planetary gear carrier 21 via the transmitting shaft 25.

The internal gear carrier 31 includes an internal gear carrier main body 33 to which the internal gear 17 is fixed, and the internal gear carrier shaft 37 which is fixed to the internal gear carrier main body 33 and extends in the axial direction centered on the axis Ar.

The carrier main body 33 includes an internal gear cylindrical portion 35 which has a cylindrical shape centered on the axis Ar and has the internal gear 17 fixed to the inner circumferential side thereof, and an internal gear input-side arm portion 36 which extends inward from an input-side end of the internal gear cylindrical portion 35 in the radial direction.

The internal gear carrier shaft 37 having a column shape centered on the axis Ar is disposed on the input side of the sun gear shaft 12 having a column shape centered on the axis Ar. The internal gear input-side arm portion 36 of the internal gear carrier main body 33 is fixed to the internal gear carrier shaft 37. The internal gear carrier shaft 37 is inserted through the inner circumferential side of the cylindrical input-side planetary gear carrier shaft 27i.

The internal gear carrier shaft 37 is a constant-speed input shaft Ac which rotates at a constant speed under a driving force of the constant-speed motor 51. The input-side planetary gear carrier shaft 27i is a variable speed input shaft Av which rotates at an arbitrary rotation rate under a driving force of the variable-speed motor 71. The variable speed increaser 1 can change the rotation rate of sun gear shaft 12 which is an output shaft Ao of the transmission device 10 connected to the driving target by changing the rotation rate of the variable-speed motor 71.

At the time of normal operation, except for the time of startup, the output shaft Ao has a variable rotation rate within an operation range Ro (refer to FIG. 6) between a maximum rotation rate and a minimum rotation rate. The output shaft Ao is rotated with a rotation rate necessary for operating the compressor C with high efficiency as an intermediate rotation rate. The intermediate rotation rate is an intermediate rotation rate between the maximum rotation rate and the minimum rotation rate of the output shaft Ao. For example, when a rated rotation rate is 100%, the intermediate rotation rate is set to a rotation rate of about 90%, which is lower than the rated rotation rate. In this case, the maximum rotation rate is a rotation rate which exceeds the rated rotation rate, for example, a rotation rate of about 105%. Further, the minimum rotation rate is a rotation rate of about 75%.

Figure 3:
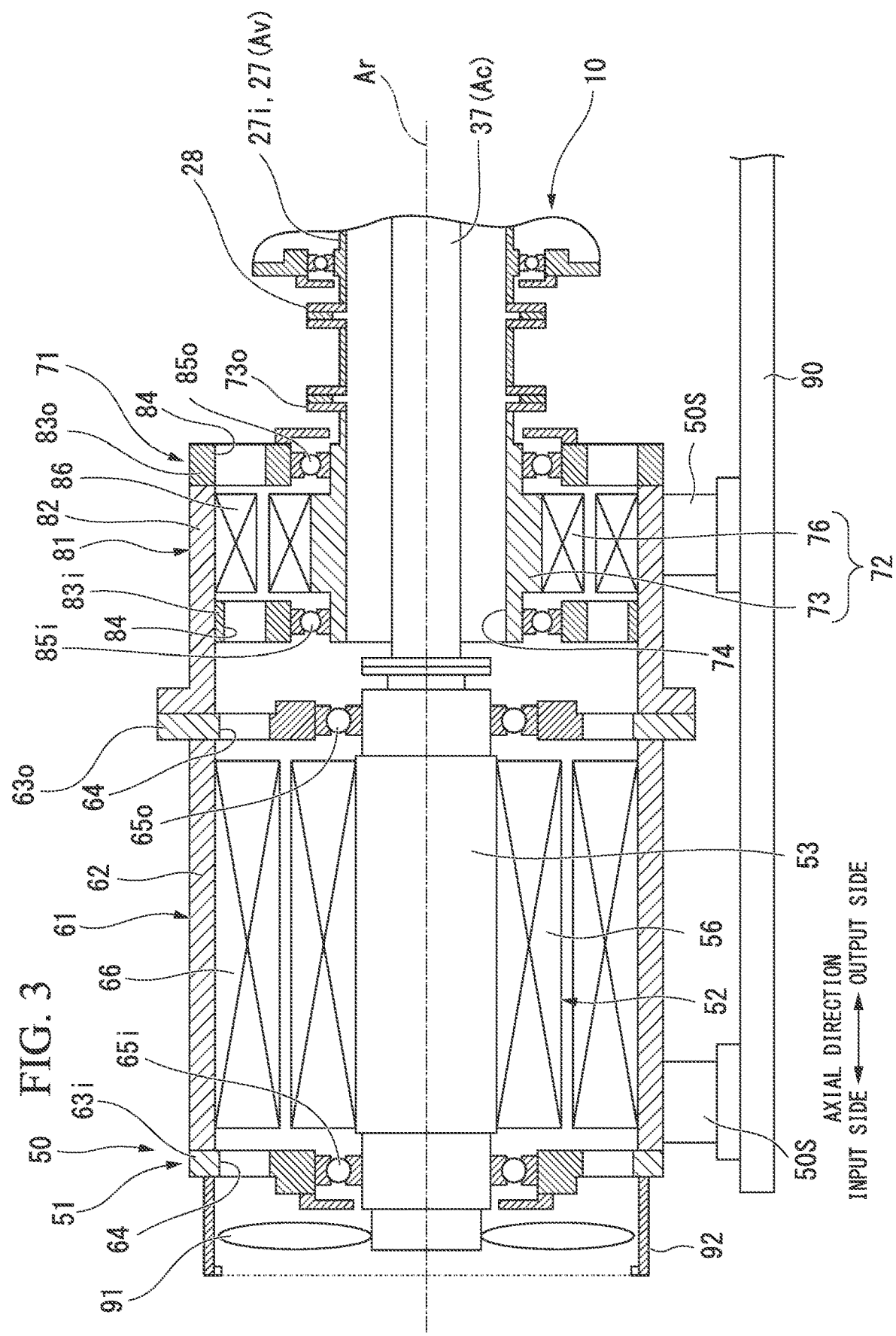
FIG. 3 is a cross-sectional view of an electric driving device according to the first embodiment of the present invention.

As shown in FIG. 3, the constant-speed motor 51 rotationally drives the internal gear carrier shaft 37 of the transmission device 10. The constant-speed motor 51 has a rated torque which allows the rotation rate of the output shaft Ao within the operation range Ro to be the maximum rotation rate by itself. The variable-speed motor 71 rotationally drives the input-side planetary gear carrier shaft 27i of the transmission device 10. The electric driving device 50 further includes a cooling fan 91 which cools the constant-speed motor 51 and a fan cover 92 which covers the cooling fan 91.

In the embodiment, the constant-speed motor 51 is, for example, a four-pole three-phase induction motor. Further, the variable-speed motor 71 is an eight-pole three-phase induction motor having more poles than the constant-speed motor 51. The specifications of the constant-speed motor 51 and the variable-speed motor 71 are not limited to these and can be appropriately changed.

The constant-speed motor 51 includes a constant-speed rotor 52 which rotates about the axis Ar and is connected to the internal gear carrier shaft 37 which is the constant-speed input shaft Ac of the transmission device 10, a constant-speed stator 66 disposed on the outer circumferential side of the constant-speed rotor 52, and a constant-speed motor casing 61 in which the constant-speed stator 66 is fixed to the inner circumferential side thereof.

The constant-speed rotor 52 includes a constant-speed rotor shaft 53 which has a column shape centered on the axis Ar, and a conductive body 56 fixed to the outer circumference of the constant-speed rotor shaft 53. The cooling fan 91 is fixed to the input-side end of the constant-speed rotor shaft 53.

The constant-speed stator 66 is disposed outward from the conductive body 56 of the constant-speed rotor 52 in the radial direction. This constant-speed stator 66 is formed of a plurality of coils.

The constant-speed motor casing 61 includes a constant-speed casing main body 62 having a cylindrical shape centered on the axis Ar and in which the constant-speed stator 66 is fixed to the inner circumferential side thereof, and covers 63i and 63o which close both axial ends of the cylindrical constant-speed casing main body 62. Constant-speed rotor bearings 65i and 65o are installed at the respective covers 63i and 63o to rotatably support the constant-speed rotor shaft 53 about the axis Ar. A plurality of openings 64 axially passing through the respective covers 63i and 63o at positions outward from the constant-speed rotor bearing 65i in the radial direction are formed in the respective covers 63i and 63o.

The input-side end of the constant-speed rotor shaft 53 protrudes toward the input side from the input-side cover 63i of the constant-speed motor casing 61. The cooling fan 91 is fixed to the input-side end of the constant-speed rotor shaft 53. The fan cover 92 is fixed to the input-side cover 63i of the constant-speed motor casing 61.

The variable-speed motor 71 includes a variable-speed rotor 72 which rotates about the axis Ar and is connected to the input-side planetary gear carrier shaft 27i which is the variable-speed input shaft Av, a variable-speed stator 86 disposed on the outer circumferential side of the variable-speed rotor 72, and a variable-speed motor casing 81 in which the variable-speed stator 86 is fixed to the inner circumferential side thereof.

The variable-speed rotor 72 has a variable-speed rotor shaft 73 and a conductive body 76 fixed to the outer circumference of the variable-speed rotor shaft 73. The variable-speed rotor shaft 73 has a cylindrical shape around the axis Ar and has a shaft insertion hole 74 passing through the variable-speed rotor shaft 73 in the axial direction. The internal gear carrier shaft 37 as the constant-speed input shaft Ac is inserted through the shaft insertion hole 74 of the variable-speed rotor shaft 73. An annular variable-speed flange 73o expanding outward in the radial direction is formed at the output-side end of the variable-speed rotor shaft 73.

The variable-speed stator 86 is disposed outward from the conductive body 76 of the variable-speed rotor 72 in the radial direction. The variable-speed stator 86 is formed of a plurality of coils.

The variable-speed motor casing 81 includes a casing main body 82 having a cylindrical shape around the axis Ar and to the inner circumferential side of which the variable-speed stator 86 is fixed, an output-side cover 83o which covers the output-side end of the cylindrical casing main body 82, and an inlet-side cover 83i disposed on the input side of the variable-speed stator 86 and fixed to the inner circumferential side of the cylindrical casing main body 82. Variable-speed rotor bearings 85i and 85o which rotatably support the variable-speed rotor shaft 73 about the axis Ar are installed at the respective covers 83i and 83o. In the respective covers 83i and 83o, a plurality of openings 84 passing through the respective covers 83i and 83o in the axial direction are formed at positions outward from the variable-speed rotor bearings 85i and 85o in the radial direction.

A space in the variable-speed motor casing 81 and a space in the constant-speed motor casing 61 communicate with each other through the plurality of openings 84 formed in the respective covers 83i and 83o of the variable-speed motor casing 81 and the plurality of openings 64 formed in the respective covers 63i and 63o of the constant-speed motor casing 61.

Further, in the variable speed increaser 1 of the present embodiment, the constant-speed rotor 52, the variable-speed rotor 72 and the sun gear shaft 12 are disposed on the same axis Ar.

Figure 4:
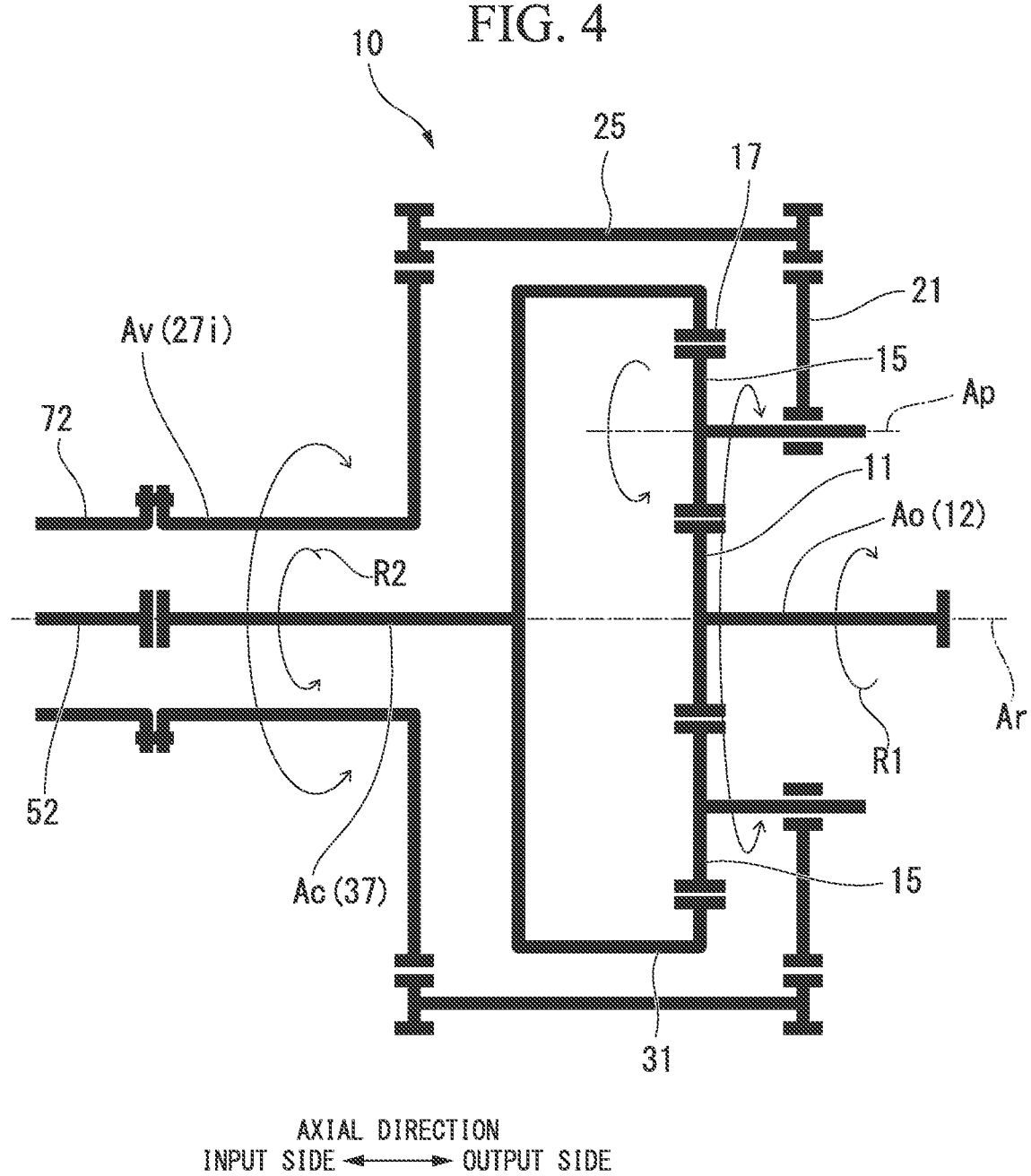
FIG. 4 is a schematic diagram showing a constitution of a transmission device according to the first embodiment of the present invention.

As shown in FIG. 4, the constant-speed motor 51 rotates the constant-speed rotor 52 only in a second direction R2 when electric power is supplied. The second direction R2 is a direction toward one side in the circumferential direction of the axis Ar and is a drive rotation direction of the constant-speed motor 51. As the constant-speed rotor 52 rotates in the second direction R2, the internal gear carrier shaft 37, the internal gear carrier 31, and the internal gear 17 rotate in the second direction R2. Therefore, the planetary gear 15 is rotated in the second direction R2 via the internal gear 17. As a result, the constant-speed rotor 52 rotates in the second direction R2, and thus the output shaft Ao rotates in a first direction R1 opposite to the second direction R2.

Therefore, the forward rotation of the constant-speed motor 51 is the second direction R2, and the forward rotation of the output shaft Ao of the transmission device 10 is the first direction R1. The compressor C operates normally as the output shaft Ao rotates forward.

In the following description, a rotation direction of the first direction R1 is a minus (negative) rotation direction, and a rotation direction of the second direction R2 is a plus (positive) rotation direction. Therefore, for example, the rotation rate of the constant-speed rotor 52 which rotates in the second direction R2 in the constant-speed motor 51 is +1800 rpm and is constant.

The variable-speed motor 71 is capable of rotating the variable-speed rotor 72 in the first direction R1 and the second direction R2 in the circumferential direction of the axis Ar. That is, the variable-speed motor 71 is capable of rotating the variable-speed rotor 72 forward and in reverse. As the variable-speed rotor 72 rotates in the first direction R1, the input-side planetary gear carrier shaft 27i and the planetary gear carrier 21 rotate in the first direction R1. As the variable-speed rotor 72 rotates in the second direction R2, the input-side planetary gear carrier shaft 27i and the planetary gear carrier 21 rotate in the second direction R2.

The variable-speed motor 71 serves as a generator by rotating the variable-speed rotor 72 by an external force (constant-speed motor 51). Here, a state in which the variable-speed motor 71 serves as a generator is referred to as a regenerative mode. In the regenerative mode, the variable-speed motor 71 is driven by an external torque. As the variable-speed motor 71 is driven in the regenerative mode, a torque in a direction to decelerate the rotation rate of the output shaft Ao acts on the variable-speed rotor 72, and the rotation rate of the output shaft Ao decreases.

Further, the variable-speed motor 71 serves as an electric motor by the electric power being supplied. Here, a state in which the variable-speed motor 71 serves as an electric motor is referred to as a power mode. In the power mode, the variable-speed motor 71 is driven by the supplied electric power. As the variable-speed motor 71 is driven in the power mode, a torque in a direction in which the rotation rate of the output shaft Ao increases acts on the variable-speed rotor 72, and the rotation rate of the output shaft Ao increases.

The rotation direction of the variable-speed rotor 72 of the variable-speed motor 71 is not limited to a structure in which the first direction R1 is a rotation direction in the regenerative mode and the second rotation direction is a rotation direction in the power mode.

Figure 6:
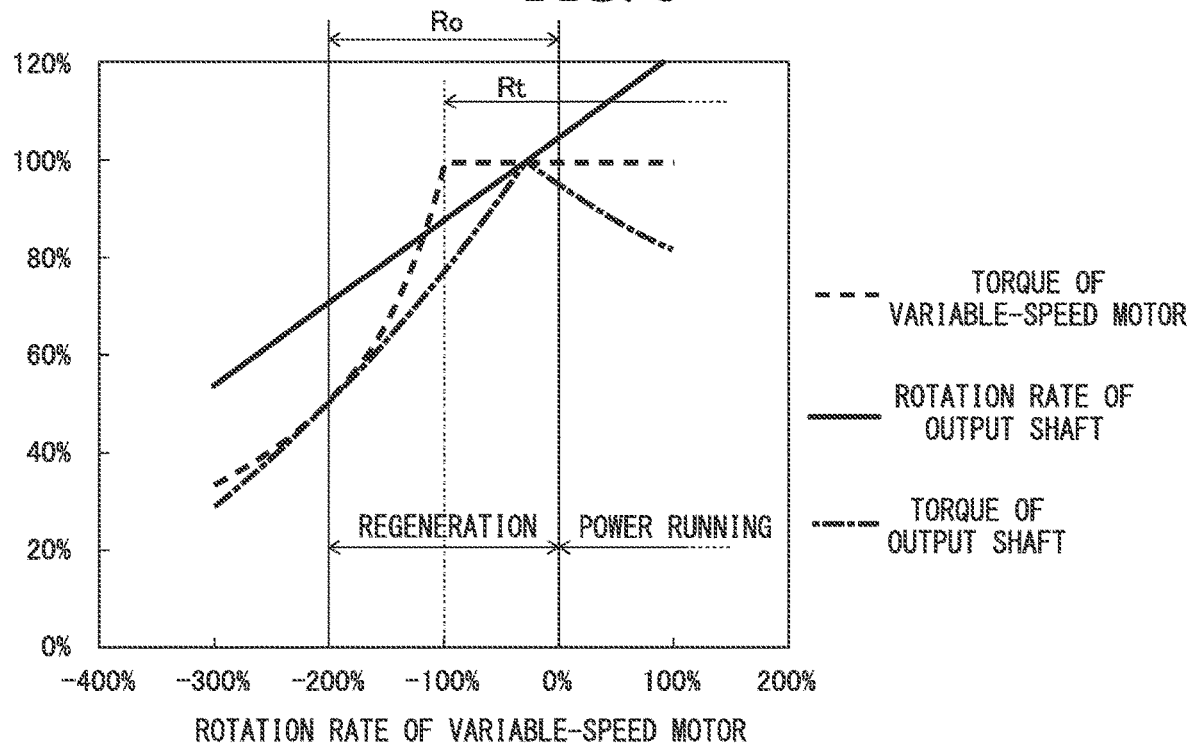
FIG. 6 is a graph showing a relationship between a rotation rate of an output shaft, a torque of a variable-speed motor, a torque of the output shaft, and a rotation rate of the variable-speed motor in the first embodiment of the present invention.

The torque acts on the variable-speed rotor 72 to decelerate the output shaft Ao and the rotation rate of the output shaft Ao decreases from the maximum rotation rate, for example, by increasing the rotation rate of the variable-speed motor 71 in the regenerative mode from 0% (from 0% to −200% in FIG. 6).

The variable speed increaser 1 of the embodiment includes a rotation rate controller 100 which adjusts the rotation rate of the variable-speed motor 71 and an electric driving device controller 120 which controls an operation of the rotation rate controller 100.

The electric driving device controller 120 is configured of a computer. The electric driving device controller 120 includes a receiving portion 121 which directly receives an instruction from an operator or receives an instruction from a host control device, an interface 122 which provides instructions to the rotation rate controller 100, and a calculating portion 123 which creates an instruction for the rotation rate controller 100 according to the instructions received by the receiving portion 121 or the like.

The rotation rate controller 100 changes a frequency of the supplied electric power or the torque in the variable-speed motor 71. The rotation rate controller 100 changes the rotation direction of the variable-speed motor 71 by changing a phase of a voltage applied to the variable-speed motor 71. That is, the rotation rate controller 100 is capable of rotating the variable-speed rotor 72 forward and in reverse.

The rotation rate controller 100 supplies the electric power having the frequency instructed from the electric driving device controller 120 to the variable-speed motor 71. In the variable-speed motor 71, the variable-speed rotor 72 rotates at a rotation rate corresponding to this frequency. Since the rotation rate of the variable-speed rotor 72 changes in this manner, the rotation rate of the planetary gear carrier 21 of the transmission device 10 connected to the variable-speed rotor 72 also changes. As a result, the rotation rate of the output shaft Ao of the transmission device 10 also changes.

As shown in FIG. 6, specifically, the rotation rate controller 100 adjusts the rotation rate of the variable-speed motor 71 in the regenerative mode within a range of 0% to −200% (within the operation range Ro of the output shaft Ao) during the normal operation except for the time of startup. That is, the rotation rate controller 100 drives the variable-speed motor 71 only in the regenerative mode, without driving the variable-speed motor 71 in the power mode, except at the time of startup.

The rotation rate controller 100 reduces the rotation rate of the output shaft Ao from the maximum rotation rate by increasing the rotation rate of the variable-speed motor 71 in the regenerative mode to approach −200%. At this time, when the rotation rate of the variable-speed motor 71 in the regenerative mode is −100% (when the rotation rate of the variable-speed motor 71 in the regenerative mode becomes the maximum value within a constant-torque region Rt in which constant torque control is possible in the variable-speed motor 71), the rotation rate of the output shaft Ao is the intermediate rotation rate. Therefore, the rotation rate controller 100 adjusts the rotation rate of the variable-speed motor 71 in the regenerative mode so that the rotation rate of the output shaft Ao is set to the minimum rotation rate within a range in which the torque of the variable-speed motor 71 reduces beyond the constant-torque region Rt. Specifically, when the rotation rate controller 100 sets the rotation rate of the variable-speed motor 71 in the regenerative mode to −200% of the maximum value, the rotation rate of the output shaft Ao becomes the minimum rotation rate.

The rotation rate controller 100 increases the rotation rate of the output shaft Ao to approach the maximum rotation rate by decreasing the rotation rate of the variable-speed motor 71 in the regenerative mode to approach 0%. Therefore, when the rotation rate controller 100 sets the rotation rate of the variable-speed motor 71 in the regenerative mode to 0% which is the minimum value, the rotation rate of the output shaft Ao becomes the maximum rotation rate.

Meanwhile, the rotation rate controller 100 adjusts the rotation rate of the variable-speed rotor 72 so that the torque of the variable-speed motor 71 does not fall below the torque of the output shaft Ao in a state in which the rotation rate of the variable-speed motor 71 in the regenerative mode is within the range from 0% to −200%.

Next, a control method of the variable speed increaser 1 according to the embodiment will be described.

Figure 5:
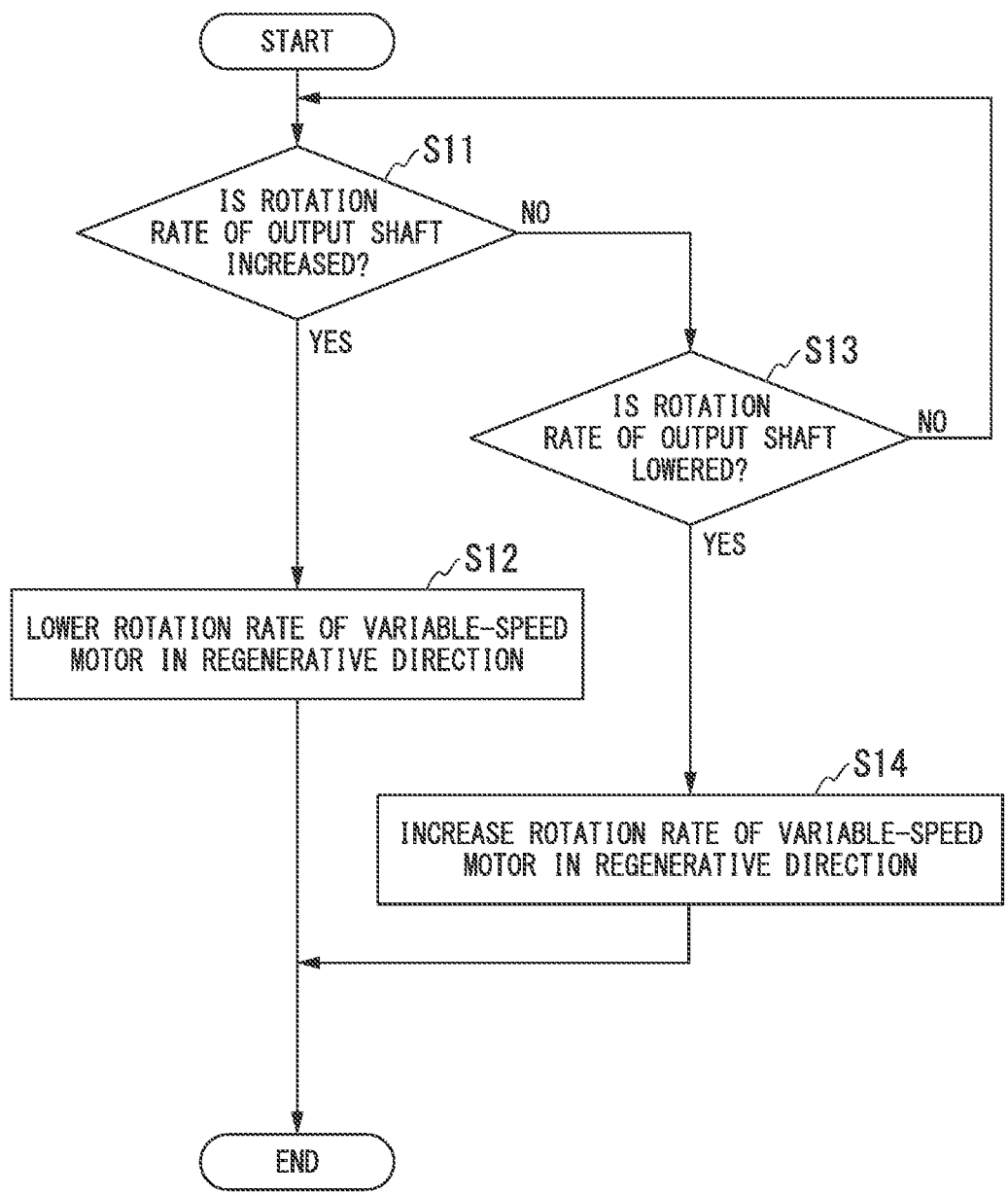
FIG. 5 is a flowchart showing a control method of a variable speed increaser according to the present invention.

In the variable speed increaser 1 in which the compressor C is operated at a rated point at which it can operate with high efficiency and the rotation rate of the output shaft Ao is the intermediate rotation rate, a case in which the rotation rate of the output shaft Ao is adjusted will be described as an example. As shown in FIG. 5, when the electric driving device controller 120 receives an instruction to increase the rotation rate of the output shaft Ao (S11), an instruction to lower the rotation rate of the variable-speed motor 71 in the regenerative mode is output to the rotation rate controller 100 (S12). Therefore, the rotation rate of the variable-speed motor 71 in the regenerative mode decreases from −100% to approach 0%. As a result, in the transmission device 10, a speed of the output shaft Ao is increased, and the rotation rate of the output shaft Ao is increased.

Conversely, when the electric driving device controller 120 receives an instruction to lower the rotation rate of the output shaft Ao (S13), an instruction to increase the rotation rate of the variable-speed motor 71 in the regenerative mode is outputted to the rotation rate controller 100 (S14). Therefore, the rotation rate of the variable-speed motor 71 in the regenerative mode increases from −100% to approach −200%. As a result, in the transmission device 10, the output shaft Ao is decelerated, and the rotation rate of the output shaft Ao is reduced.

At the time of starting the constant-speed motor 51 and rotating the constant-speed rotor 52 from a stopped state, it is necessary to drive the variable-speed motor 71 in the power mode (for example, rotation rate of +10%) and to prevent the variable-speed rotor 72 from over-rotating. Specifically, when the constant-speed motor 51 is started with the variable-speed motor 71 in a non-controlled state, the torque is transmitted in a direction to accelerate the output shaft Ao, but since inertial energy of the output shaft Ao connected to the compressor C is large, the variable-speed rotor 72 is over-accelerated in a reverse rotation direction. Therefore, occurrence of abnormal behavior of the variable-speed rotor 72 is suppressed by controlling the variable-speed rotor 72 at a low speed rotation in the same rotation direction as a direction in which the output shaft Ao is accelerated so that the variable-speed rotor 72 does not over-rotate.

According to the above-described variable speed increaser, when the output shaft Ao is rotating within the operation range Ro, the variable-speed motor 71 is driven only in the regenerative mode. Therefore, while the compressor C is being operated by rotating the output shaft Ao, the variable-speed motor 71 is prevented from being brought into the non-controlled state by the operation mode being switched from the regenerative mode to the power mode. As a result, in the transmission device 10, the rotation direction of the various gears such as the internal gear carrier 31 and so on is not switched in the middle. Therefore, it is possible to suppress instability of control and loss between the gears when the rotation direction of the gears in the transmission device 10 is switched. Accordingly, it is possible to efficiently operate the variable speed increaser 1 and the compressor C connected to the variable speed increaser 1.

Further, in the transmission device 10, since the rotation direction of the various gears such as the internal gear carrier 31 and so on is not switched, the transmission of the torque from the electric driving device 50 to the compressor C is continuously performed in the transmission device 10. That is, it is possible to prevent the transmission device 10 from being in an unloaded state due to discontinuous transmission of the torque in the transmission device 10, thereby preventing the operation of the transmission device 10 from becoming unstable. Accordingly, it is possible to operate the variable speed increaser 1 and the compressor C connected to the variable speed increaser 1 in a stable state.

Further, the constant-speed motor 51 has a rated torque which allows the rotation rate of the output shaft Ao to be the maximum rotation rate by itself. Due to such a configuration, the variable-speed motor 71 is operated only in the regenerative mode. Therefore, the variable-speed motor 71 is operated within a range in which the output shaft Ao rotating at the maximum rotation rate is decelerated. Thus, the variable-speed motor 71 is operated within a range in which the torque required in the compressor C is reduced. Accordingly, it is possible to adjust the rotation rate of the output shaft Ao in a wide range required for operating the compressor C without increasing the rated torque of the variable-speed motor 71. Furthermore, since the rated torque of the variable-speed motor 71 is not increased, it is possible to minimize an increase in cost of the variable speed increaser 1.

Further, since it is driven only in the regenerative mode, it is possible to recover energy generated in the constant-speed motor 51. Specifically, it is possible for the constant-speed motor 51 to mainly apply a load on the compressor C, and thus it is possible for the variable-speed motor 71 to recover extra energy which is not consumed by the compressor C on a load side as regenerative energy. Accordingly, it is possible to recover the extra energy in the variable-speed motor 71 in a form of applying a brake to the constant-speed motor 51 rotating at a maximum speed.

Also, in the operation range Ro of the output shaft Ao, the rotation rate of the variable-speed motor 71 in the regenerative mode is adjusted by the rotation rate controller 100 so that the torque of the variable-speed motor 71 does not fall below the torque of the output shaft Ao even in a range beyond the constant-torque region Rt of the variable-speed motor 71. Therefore, it is possible to prevent the operation of the variable-speed motor 71 from becoming unstable by the torque of the output shaft Ao becoming larger than the torque of the variable-speed motor 71 during the adjustment of the rotation rate of the variable-speed motor 71 in the regenerative mode.

Second Embodiment

Figure 7:
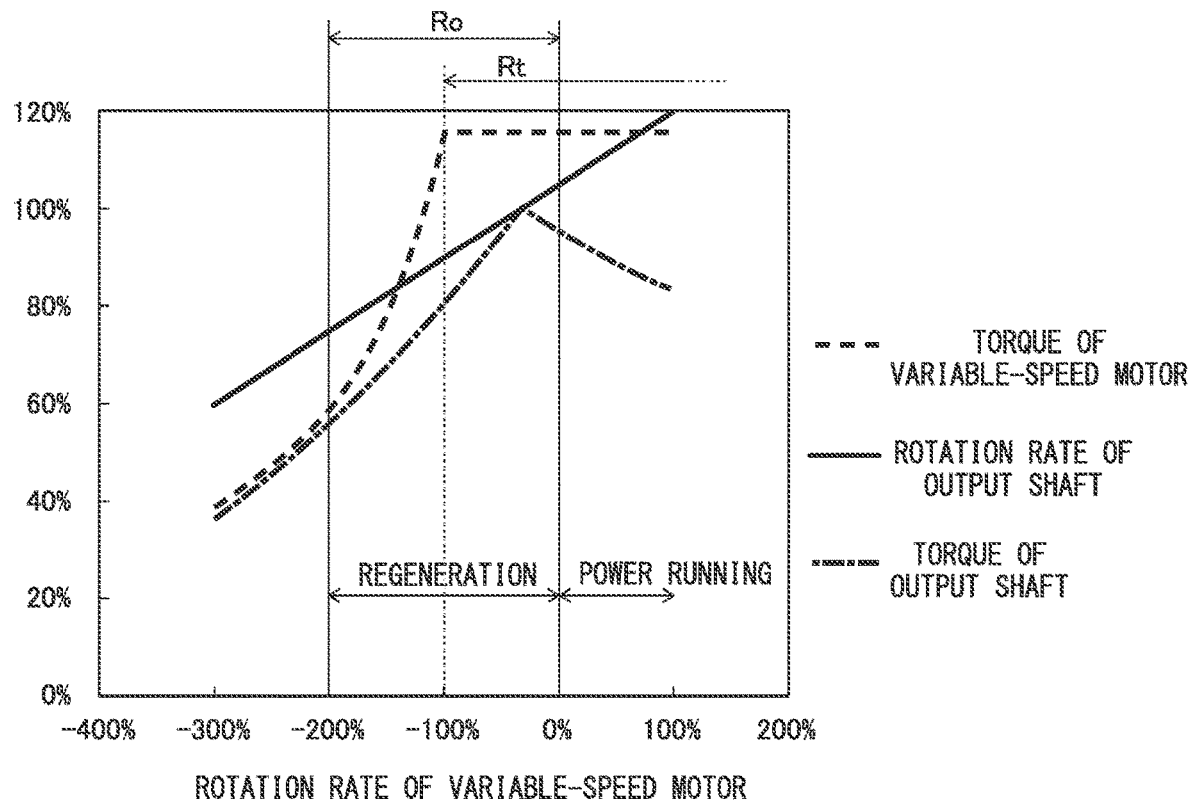
FIG. 7 is a graph showing a relationship between a rotation rate of an output shaft, a torque of a variable-speed motor, a torque of the output shaft, and a rotation rate of the variable-speed motor in a second embodiment of the present invention.

Next, the variable speed increaser of a second embodiment will be described with reference to FIG. 7.

In the second embodiment, the same reference numerals are given to the same constituent elements as those in the first embodiment, and a detailed description thereof will be omitted. A capacity of the variable-speed motor of the second embodiment is different from that of the first embodiment.

A variable-speed motor 71A has a rated torque larger than a maximum torque of the output shaft Ao. As shown in FIG. 7, a magnitude of the torque in the constant-torque region Rt of the variable-speed motor 71A is larger than the maximum torque of the output shaft Ao. Further, even when the output shaft Ao has the lowest rotation rate and the torque of the output shaft Ao becomes the lowest, the torque of the variable-speed motor 71A is higher than the torque of the output shaft Ao.

As a result, it is possible to reliably prevent the torque of the variable-speed motor 71A from falling below the torque of the output shaft Ao during the adjustment of the rotation rate of the variable-speed motor 71A in the regenerative mode, and it is possible to reliably suppress the unstable operation of the variable-speed motor 71A.

Third Embodiment

Next, the variable speed increaser of a third embodiment will be described with reference to FIG. 8.

In the third embodiment, the same reference numerals are given to the same constituent elements as those in the first embodiment and the second embodiment, and a detailed description thereof will be omitted. An internal structure of the transmission device of the third embodiment is different from that of the first embodiment.

In a transmission device 10A of the third embodiment, the gear which was the internal gear 17 in the first embodiment is an external gear 17A. Therefore, the gear carrier shaft which was the internal gear carrier shaft 37 in the first embodiment is an external gear carrier shaft 37A.

Figure 8:
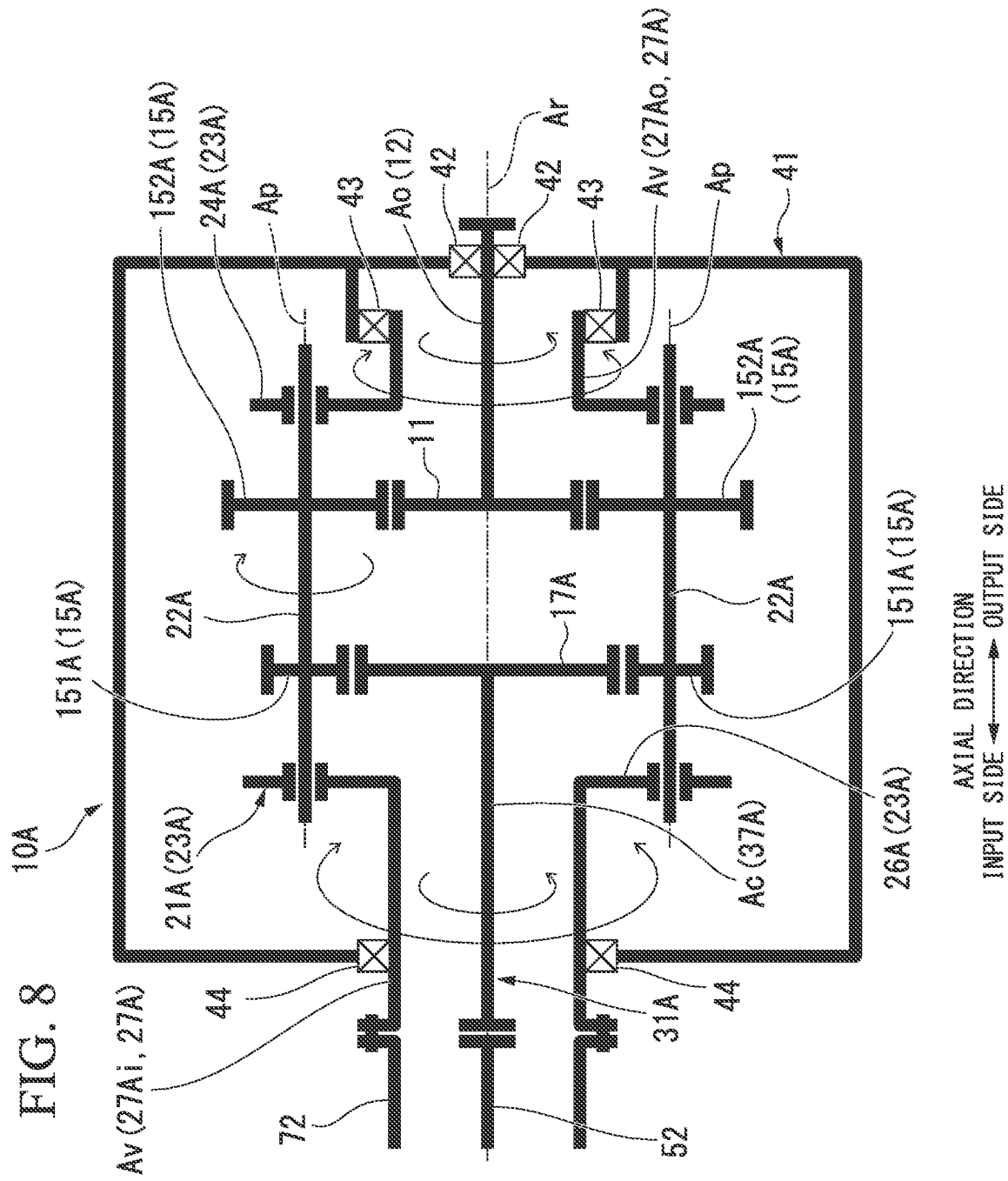
FIG. 8 is a schematic diagram showing a constitution of a transmission device according to a third embodiment of the present invention.

Specifically, as shown in FIG. 8, the transmission device 10A of the third embodiment includes the sun gear 11, the sun gear shaft 12, a planetary gear 15A, the external gear (gear) 17A, a planetary gear carrier 21A, an external gear carrier (gear carrier) 31A, and the transmission casing 41 which covers these elements.

The planetary gear 15A of the third embodiment includes a plurality of first planetary gears (primary gears) 151A and a plurality of second planetary gears (secondary gears) 152A.

The first planetary gear 151A meshes with the external gear 17A. The first planetary gear 151A revolves around the axis Ar and also rotates about its own center line Ap.

The second planetary gear 152A meshes with the sun gear 11. The second planetary gear 152A revolves around the axis Ar and also rotates about its own center line Ap which is the same as that of the first planetary gear 151A. The second planetary gear 152A is disposed on the output side in the axial direction with respect to the first planetary gear 151A. One of the second planetary gears 152A is rotatable integrally with one of the first planetary gears 151A. That is, one first planetary gear 151A is disposed in a pair with respect to one second planetary gear 152A.

The planetary gear carrier 21A of the third embodiment includes a planetary gear shaft 22A, a planetary gear carrier main body 23A, and a planetary gear carrier shaft 27A.

The planetary gear shaft 22A is provided for each of the planetary gears 15A. The planetary gear shaft 22A allows the first planetary gear 151A and the second planetary gear 152A connected to each other to rotate about the center line Ap. The planetary gear shaft 22A connects one second planetary gear 152A with one first planetary gear 151A. Specifically, the first planetary gear 151A is connected to the input side of the planetary gear shaft 22A in the axial direction, and the second planetary gear 152A is connected to the output side of the planetary gear shaft 22A in the axial direction. The planetary gear shaft 22A passes through the first planetary gear 151A and the second planetary gear 152A in the axial direction. Therefore, the input-side end of the planetary gear shaft 22A in the axial direction is located on the input side with respect to the first planetary gear 151A in the axial direction. Further, the output-side end of the planetary gear shaft 22A in the axial direction is located on the output side with respect to the second planetary gear 152A in the axial direction.

The planetary gear carrier main body 23A fixes mutual positions of a plurality of planetary gear shafts 22A. The planetary gear carrier main body 23A includes a planetary gear output-side arm portion 24A and a planetary gear input-side arm portion 26A.

The planetary gear output-side arm portion 24A rotatably supports the output-side ends of the plurality of planetary gear shafts 22A in the axial direction. The planetary gear input-side arm portion 26A rotatably supports the input-side ends of the plurality of planetary gear shafts 22A in the axial direction. The planetary gear carrier 21A coaxially supports the first planetary gear 151A and the second planetary gear 152A by supporting the planetary gear shafts 22A via the planetary gear carrier main body 23A in this manner.

The planetary gear carrier shaft 27A fixes the planetary gear carrier main body 23A. The planetary gear carrier shaft 27A extends in the axial direction about the axis Ar. The planetary gear carrier shaft 27A includes an output-side planetary gear carrier shaft 27Ao which extends from the planetary gear output-side arm portion 24A to the output side, and an input-side planetary gear carrier shaft 27Ai which extends from the planetary gear input-side arm portion 26A to the input side. Both the output-side planetary gear carrier shaft 27Ao and the input-side planetary gear carrier shaft 27Ai are formed in a cylindrical shape with the axis Ar as a center.

The output-side planetary gear carrier shaft 27Ao is supported by the first planetary gear carrier bearing 43 to be rotatable about the axis Ar with respect to the transmission casing 41. In the first planetary gear carrier bearing 43, the sun gear shaft 12 is inserted through the inner circumferential side of the output-side planetary gear carrier shaft 27Ao disposed on the output side with respect to the planetary gear output-side arm portion 24A.

The input-side planetary gear carrier shaft 27Ai is supported by the second planetary gear carrier bearing 44 to be rotatable about the axis Ar with respect to the transmission casing 41. The second planetary gear carrier bearing 44 is disposed on the input side with respect to the planetary gear input-side arm portion 26A. The external gear carrier shaft 37A which will be described later is inserted through the inner circumferential side of the input-side planetary gear carrier shaft 27Ai.

The external gear carrier 31A supports the external gear 17A to be rotatable about the axis Ar. The external gear carrier 31A has the external gear carrier shaft 37A connected to the external gear 17A.

The external gear carrier shaft 37A is fixed to the external gear 17A around the axis Ar and extends in the axial direction. The external gear carrier shaft 37A is formed in a circular column shape centered on the axis Ar. The external gear carrier shaft 37A extends from the external gear 17A to the input side in the axial direction. The input-side portion of the external gear carrier shaft 37A is inserted through the inner circumferential side of the cylindrical input-side planetary gear carrier shaft 27Ai.

Even with the variable speed increaser 1 having the above-described transmission device 10A, like in the first embodiment, it is possible to stably and efficiently operate the variable speed increaser 1 and the compressor C connected to the variable speed increaser 1.

Other Modified Examples of the Embodiments

Although the embodiments of the present invention have been described in detail with reference to the drawings, the constitutions and combinations in the respective embodiments are merely examples, and additions, omissions, substitutions, and other modifications of the constitutions are possible without departing from the scope of the present invention. Further, the present invention is not limited by the embodiments and is limited only by the claims.

The configuration of the transmission device 10A is not limited to the gear constitution, like the above-described first or third embodiment. Specifically, the gear which meshes with the planetary gears 15 and 15A may be one of the internal gear 17 like in the first embodiment and the external gear 17A like in the third embodiment, and also the number thereof is not limited to the configuration like in this embodiment. Therefore, for example, the gear which meshes with the planetary gear 15 may have a configuration in which two or more internal gears 17 are provided, like the first embodiment. In addition, the gear which meshes with the planetary gear 15A may have a configuration in which only one or three or more external gears 17A are provided, like the third embodiment.

Further, in the above-described embodiment, a four-pole three-phase induction motor is exemplified as the constant-speed motor 51 suitable for rotating the compressor C at high speed, and an eight-pole three-phase induction motor is exemplified as the variable-speed motor 71 suitable for varying the rotation rate of the compressor C within a certain range. However, when it is unnecessary to rotate the driving target at high speed, other types of electric motors may be used as the constant-speed motor 51 and the variable-speed motor 71.

Further, in the above-described embodiment, the shaft insertion hole 74 is formed in the variable-speed rotor 72, and the constant-speed rotor 52 is inserted through the shaft insertion hole 74. However, the shaft insertion hole 74 may be formed in the constant-speed rotor 52, and the variable-speed rotor 72 may be inserted through the shaft insertion hole 74.

Further, in the above-described embodiment, the constant-speed rotor 52, the variable-speed rotor 72, and the sun gear shaft 12 are disposed on the same axis Ar, but the present invention is not limited to such a structure. For example, the variable-speed motor 71 may be disposed so that the axis Ar of the variable-speed rotor 72 is parallel to the axis Ar of the constant-speed rotor 52 and is located at a different position. Also, for example, the variable-speed rotor 72 may be connected to the variable-speed input shaft Av via a connection structure such as another gear.

Further, the variable speed increaser 1 of the embodiment is not limited to a structure in which one variable-speed motor 71 is connected to one transmission device 10 or 10A. For example, a plurality of variable-speed rotors 72 may be connected to one variable-speed input shaft Av so that a plurality of variable-speed motors 71 are connected to one transmission device 10 or 10A.

Further, in the transmission device 10 of the embodiment, an idle gear may be provided at the input-side arm portion 26. In this case, the variable-speed motor 71 can rotate the variable-speed rotor 72 (the planetary gear carrier 21) in the first direction R1 as the forward direction, like the constant-speed motor 51.

Further, the operation range Ro of the output shaft Ao is not limited to the maximum rotation rate of 105% and the minimum rotation rate of 75% with respect to the rated rotation rate. The operation range Ro of the output shaft Ao may be appropriately set according to the operation conditions required for the driving target to which the output shaft Ao is connected.

Further, the rotation rate of the variable-speed motor 71 in the regenerative mode when the rotation rate of the output shaft Ao is the maximum rotation rate is not limited to 0%, like in the embodiment. The rotation rate of the variable-speed motor 71 in the regenerative mode when the rotation rate of the output shaft Ao is the maximum rotation rate may not be 0% as long as the variable-speed motor 71 is driven in the regenerative mode. Similarly, the rotation rate of the variable-speed motor 71 in the regenerative mode when the rotation rate of the output shaft Ao is the minimum rotation rate is not limited to −200%, like in the embodiment. The rotation rate of the variable-speed motor 71 in the regenerative mode when the rotation rate of the output shaft Ao is the minimum rotation rate may also not be −200% as long as the variable-speed motor 71 is driven in the regenerative mode.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A variable speed increaser comprising:
an electric driving device which generates a rotational driving force; and
a planetary gear transmission device which changes the speed of the rotational driving force transmitted from the electric driving device to a constant-speed input shaft and a variable-speed input shaft and transmits the changed rotation driving force to a driving target through an output shaft,
wherein the electric driving device comprises:
a constant-speed motor having a constant-speed rotor which rotates the constant-speed input shaft of the planetary gear transmission device; and
a variable-speed motor having a variable-speed rotor which rotates the variable-speed input shaft of the planetary gear transmission device and driven in a regenerative mode in which the variable-speed motor serves as a generator and in a power mode in which the variable-speed motor serves as an electric motor,
wherein the variable speed increaser further comprises a rotation rate controller which adjusts a rotation rate of the variable-speed motor,
wherein a rotation rate of the output shaft varies within an operation range between a maximum rotation rate and a minimum rotation rate,
wherein the constant-speed motor has a rated torque which allows the rotation rate of the output shaft to be the maximum rotation rate by itself, and
wherein the rotation rate controller changes the rotation rate of the output shaft rotating within the operation range by driving the variable-speed motor only in the regenerative mode.

2. The variable speed increaser according to claim 1, wherein the rotation rate controller sets the rotation rate of the output shaft within the operation range to an intermediate rotation rate between the maximum rotation rate and the minimum rotation rate when the rotation rate of the variable-speed motor in the regenerative mode in a constant-torque region in which constant torque control is possible in the variable-speed motor becomes a maximum value.

3. The variable speed increaser according to claim 1, wherein the rotation rate controller sets the output shaft to have the minimum rotation rate by increasing the rotation rate of the variable-speed motor in the regenerative mode to a range beyond a constant-torque region in which the constant torque control is possible in the variable-speed motor.

4. The variable speed increaser according to claim 1, wherein the rotation rate controller adjusts the rotation rate of the variable-speed motor in the regenerative mode so that a torque of the variable-speed motor does not fall below a torque of the output shaft.

5. The variable speed increaser according to claim 1, wherein the variable-speed motor has a rated torque larger than a maximum torque of the output shaft.

6. A method of controlling a variable speed increaser which comprises an electric driving device which generates a rotational driving force, and a planetary gear transmission device which changes the speed of the rotational driving force transmitted from the electric driving device to a constant-speed input shaft and a variable-speed input shaft and transmits the changed rotation driving force to a driving target through an output shaft, and in which the electric driving device comprises a constant-speed motor having a constant-speed rotor which rotates the constant-speed input shaft of the planetary gear transmission device, and a variable-speed motor having a variable-speed rotor which rotates the variable-speed input shaft of the planetary gear transmission device and driving in a regenerative mode in which the variable-speed motor serves as a generator and in a power mode in which the variable-speed motor serves as an electric motor, wherein a rotation rate of the output shaft varies within an operation range between a maximum rotation rate and a minimum rotation rate, and wherein the constant-speed motor has a rated torque which allows the rotation rate of the output shaft within the operation range to be a maximum value by itself, the method comprising:
changing the rotation rate of the output shaft rotating within the operation range by driving the variable-speed motor only in the regenerative mode.

* * * * *